S. PAQUETTE.
WOOD TURNING MACHINE.
APPLICATION FILED AUG. 19, 1915.

1,172,040.

Patented Feb. 15, 1916.
6 SHEETS—SHEET 3.

WITNESSES:

INVENTOR,
Samuel Paquette,
BY
ATTORNEY.

UNITED STATES PATENT OFFICE.

SAMUEL PAQUETTE, OF CHICOPEE, MASSACHUSETTS.

WOOD-TURNING MACHINE.

1,172,040.  Specification of Letters Patent.  Patented Feb. 15, 1916.

Application filed August 19, 1915. Serial No. 46,252.

*To all whom it may concern:*

Be it known that I, SAMUEL PAQUETTE, a citizen of the United States of America, and resident of Chicopee, in the county of Hampden and State of Massachusetts, have invented certain new and useful Improvements in Wood-Turning Machines, of which the following is a full, clear, and exact description.

This invention relates to a turning machine, and more particularly to one for wood turning, and the same has been originally designed for the turning of bobbins from cross sectional square bars or blanks of wood.

Included in the machine is a positively driven head stock spindle and a tail spindle between which spindles the blank to be turned is chucked. The machine also includes a pair of cutters and means for imparting backward and forward longitudinal movements thereto so that the first cutter is caused to have a pass in one direction along the blank for reducing it, to be then followed by a second cutter which in its pass further reduces the blank. The second cutter next has its return movement, it making its second cut on the blank, which is the third cut made, and the cutter which had first operated then makes its return movement for the second cut, thereby, which is the fourth cut on the blank and which brings it to its final shape.

The machine includes means for the causing of the cutters to have their movements in succession and in the intervals stated. The machine also includes means for controlling the depths of the cuts made by the cutters; and altogether the machine is automatic as to all of its operations with the exception of the operation of endwise moving the tail spindle (which is manually done) for mounting or chucking the blank to be turned and for the removal, when completed, of the finished bobbin or other turned piece.

The invention is described in conjunction with the accompanying drawings and is set forth in the claims.

The views, Figs. 1 to 5 inclusive are drawn from the machine with the parts thereof in the same position, that is such as they occupy when the cutter carriages have both completed their traverse from the head toward the tail end of the machine.

In the drawings, 20 represents the head stock spindle mounted on the bed or table-like portion of the frame 21, such spindle being constantly rotated by the belt driven pulley 22.

23 represents the tail spindle which is non-rotative but endwise slidable toward and from the head spindle 20 through the bore of the bearing support 24 therefor. The weighted lever 25 by link 26 connected to the spindle 23 maintains it normally in its approached relation to the head spindle and provides means whereby through manually swinging the lever it is caused to have its withdrawal or recedence away from the head spindle for the removal of the finished piece and the insertion of a new blank.

27 is the driving shaft for all of the mechanisms comprised in the machine, all of the mechanisms apart from the blank centering and holding spindles being automatic. The said shaft 27 is belt driven by pulley 28 and has a worm 29 thereon which is in mesh with the worm wheel 30 affixed on a shaft 31 at right angles to the driving shaft 27, and which is arranged horizontally at right angles to the length of the machine and near the left hand end of the machine as the same is viewed from its front. The shaft 31 carries a spur gear wheel 32 affixed thereon opposite which is a spur gear 33 of similar size and loose on the shaft. The spur gear 32 drives an axially vertical pinion 34 rotatable in a fixed bearing support therefor; and said pinion drives the gear wheel 33 in a direction opposite to that of the rotation of the shaft 31.

35 represents a clutch member on the hub of the spur gear 33, and 36 represents a clutch member formed on the rear face of a collar 37 which is fastened on the shaft 31,—the clutch members 35 and 36 being spaced so as to leave room between them for the pinion 38 which is loose on the shaft and is movable endwise thereon. The opposite hub portions of the pinion are made with clutch members 39 and 40, the one 39 to engage the clutch member 35 of the gear 33, and the clutch member 40 to engage the one 36 which is revoluble as one with the shaft 31,—and so that accordingly as to the positioning of the pinion, in clutch with either of the elements 33 or 37, the rack bar 42, which has the teeth on its under side in mesh with the pinion will be moved longitudinally to the rightward or to the leftward.

The rack bar constitutes the means for the bodily propulsion or traverses of the cutters 43 and 44 which may be in the form of gouge chisels or turning tools of a common kind. These tools are mounted on blocks or carriages 45 and 46 which are supported by, slidable along, and also tiltable relatively to, a round rail 47 which ranges longitudinally along the front of the machine.

The carriages 45 and 46 have arched or curved transverse arms 48 with weighted lever extensions 49, each of which is provided with two adjustable and more or less nearly vertical screws 50 and 51, those 50 having a running bearing on the longitudinal form bar 52, and those 51 having a running bearing on the longitudinal form bar 53 at the rear of the machine, the form bar 52 being stationary while the form bar 53 has in conjunction therewith mechanism for elevating it, holding it elevated for a period and then causing the lowering thereof to carry it downwardly out of position of engagement with the adjustable bearing members 51, 51, so that the bearing members 50, 50, may be let down to running engagement on the form bar 52.

54 and 55 represent latches appurtenant to the cutter carriages and mounted to swing in vertical planes so as to engage with, and disengage from shoulders 56 and 57 which are constituted by the upper portions of collars adjustably secured by set screws on the rack bar 42. The said latches 54 and 55 have depending members 54ª and 55ª whereby through inclined plates or cams 59 and 60, which are supported at different portions of the length of the machine by the rail 61, the positions of the latches are controlled so that at proper times they may engage the shoulders 56 and 57 on the rack bar and at proper times be forced to positions of disengagement with such shoulders in manner to be hereinafter more particularly explained.

The pinion 38 is embraced by a shipper lever 63 connected by pivot 64 to the left hand end portion of the frame of the machine and having an extension to the rightward and to the leftward of the pinion,— the rightward extension having an incline or cam 65 and the leftward extension having an incline or cam 66.

67 represents a dog adjustably secured by set screw 68 on the left hand end portion of the rack bar, and which when the rack bar is driven by the pinion to the required limit of its movement to the right by impingement on the incline 66 of the shipper lever 63, causes a degree of swinging of such lever to carry the pinion out of clutch with the wheel 33 and, for an instant to stop the movement of the rack bar and the feed of one of the cutters which at that time is in engagement therewith. The shipper lever has a depending lug 69 to which is connected a link 70 which is also connected to an upright arm 71 connected by pivot 72 to a fixed part 73 of the frame and provided at its upper end with a weight 74.

Figure 4:
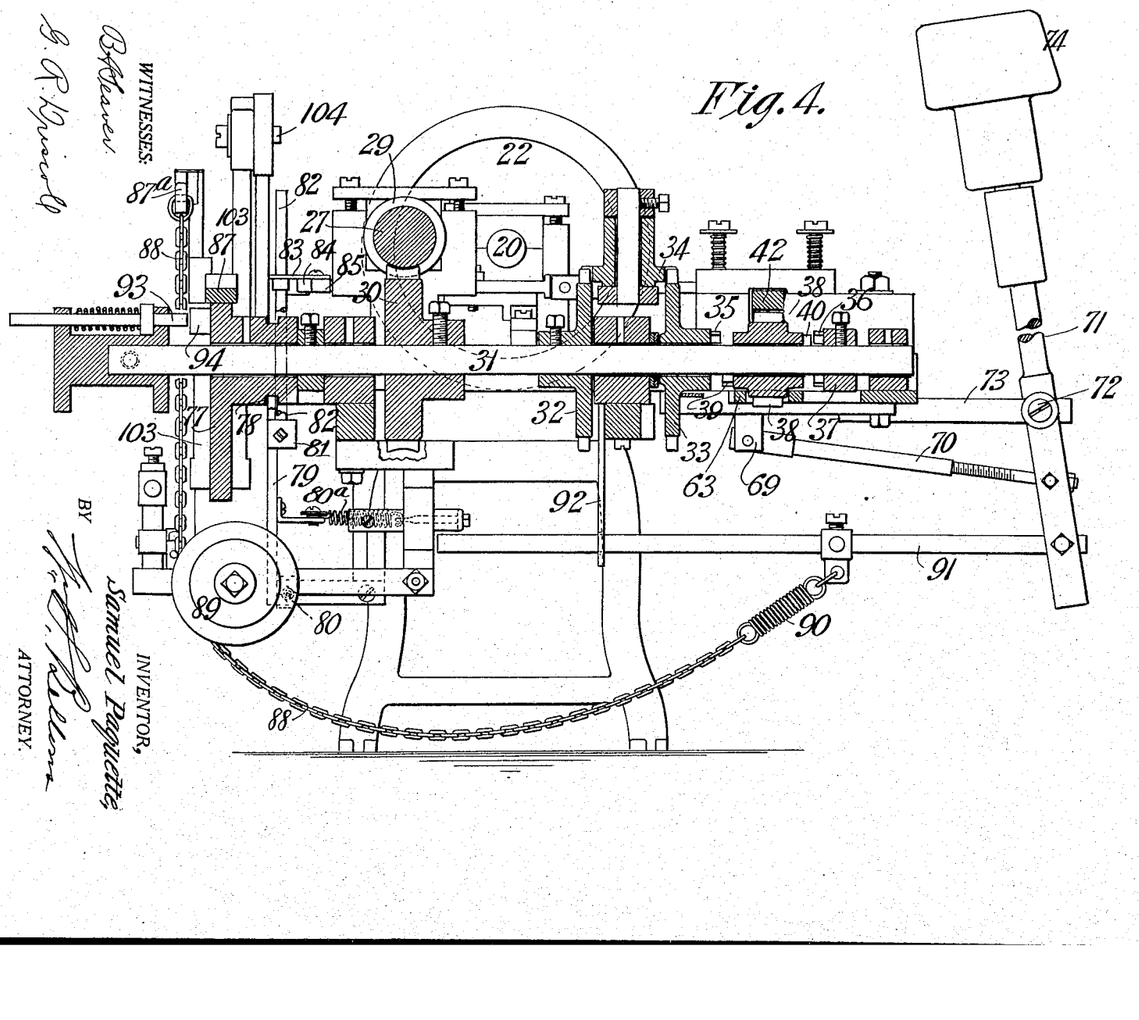
Fig. 4 is a cross sectional view, on a larger scale, taken on the line 4—4, Fig. 1, and as seen looking in the direction of the arrow.
Figure 5:
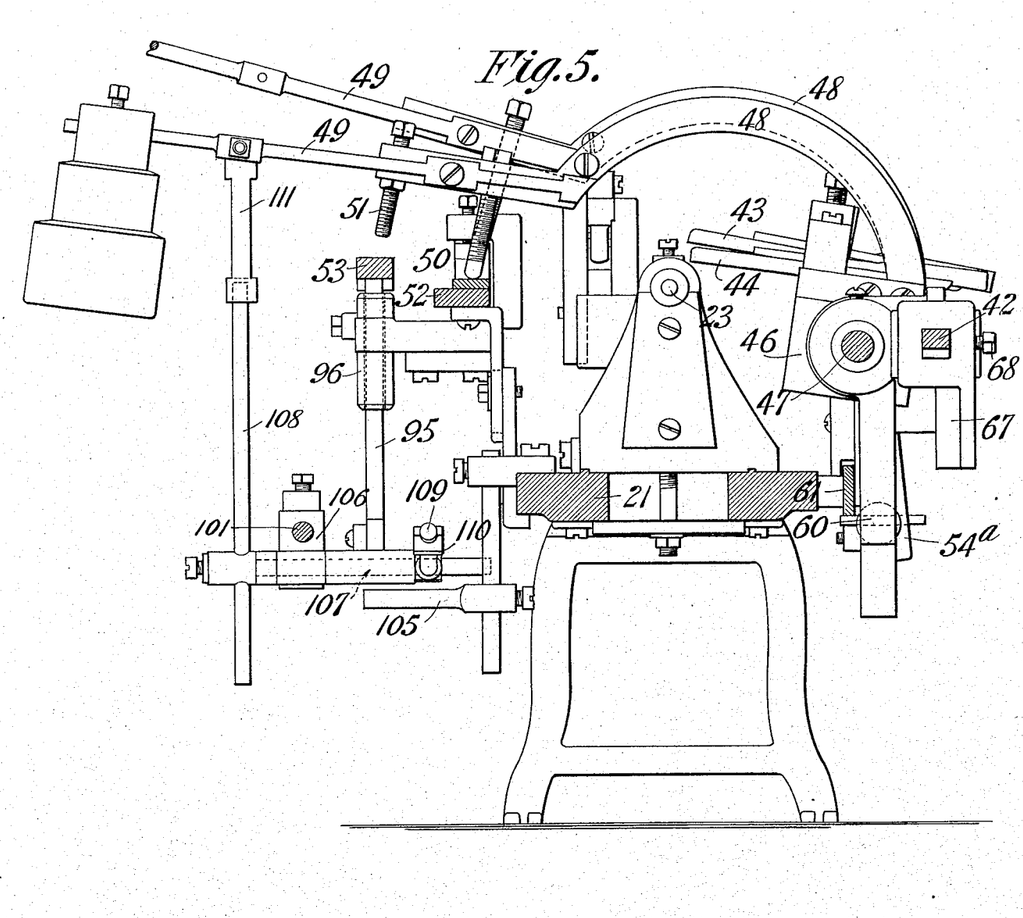
Fig. 5 is a cross sectional view, also on a larger scale, as taken on line 5—5, Fig. 1, in the direction of the arrow.
Figures 6, 7, 8, 9, 10, 11:
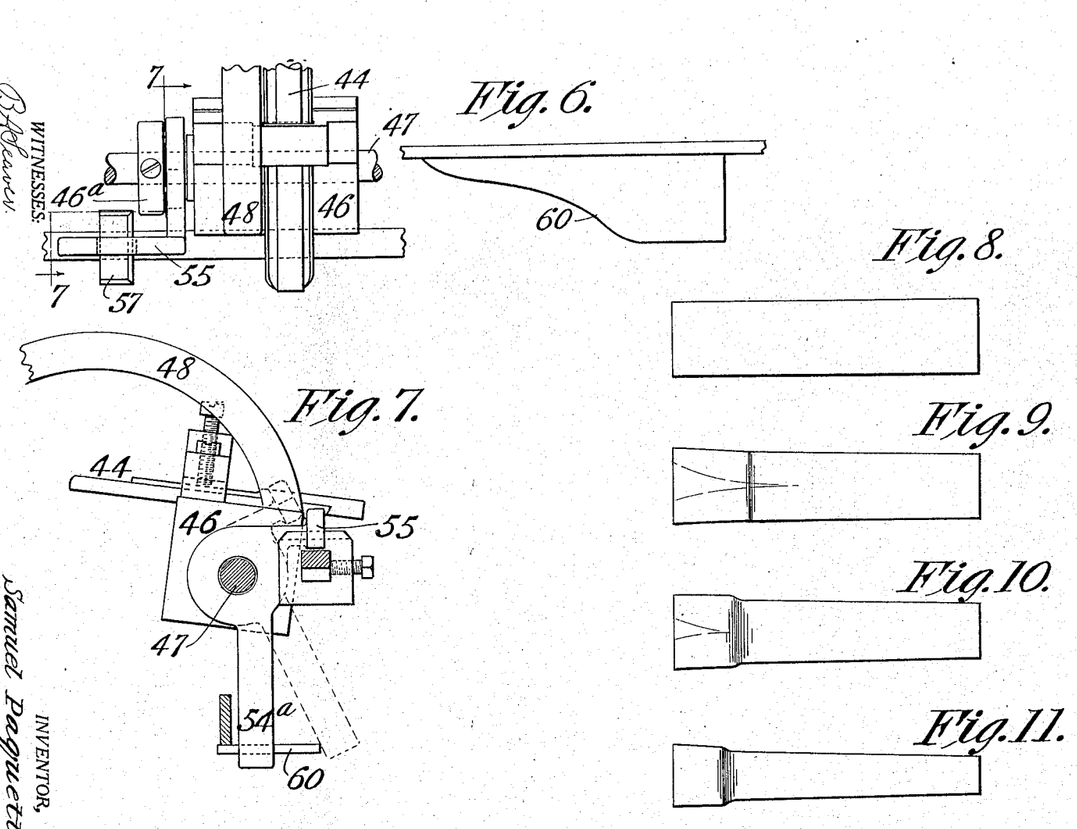
Fig. 6 is a partial plan view showing the arrangement of one of the latches appurtenant to one of the cutter carriages.
Fig. 7 is a sectional elevation as seen beyond the line 7—7, Fig. 6.
Fig. 8 is a side view showing the squared stock or blank from which the bobbin is to be turned.
Fig. 9 is a side view showing the blank as partially formed after the cutter of one carriage has made its pass.
Fig. 10 shows the blank further turned down and as accomplished by the first pass of the cutter of the second carriage.
Fig. 11 shows the completed bobbin as produced by the return passes of the second and first cutter carriages.

Referring to Fig. 4, it is observed that the pinion 38 is in its position just as it is being moved to the rightward and having its clutch member 39 drawn out from engagement with the clutch member 35 of the wheel 33 through the action of the dog 67 on the incline 66 of the shipper lever.

The final movement of the pinion toward the front of the machine to fully disengage the same from the clutch 35 of the wheel 33 is through the arrangement and adjustment of the connection 70 with the lever 71 such as to tilt the lever with its weight 74 slightly upwardly and rearwardly beyond the dead center, whereupon the weight becomes effective to further swing the lever to a greater upward and rearward inclination so that the lever becomes the means for further swinging the pinion shifting lever 63 and causing the pinion to clutch at 36 with the collar 37 which is a unitary part of the shaft 31 and securing the reversed traveling movement of the rack bar, that is now from right to left.

When the rack bar reaches its required leftward limit of travel, carrying the cutters in corresponding direction and in their proper succession, the dog 74 which is secured by set screw 75 on an intermediate part of the rack bar has an impingement against the cam incline 65 at the right hand end of the shipper lever and causes the swinging of such lever so that its pinion engaging portion is moved to the rearward and causes the pinion to be thrown out of clutch with the shaft carried clutch member and toward, but not fully into clutch with the wheel 33, the parts again assuming positions approximately the same as in Fig. 4.

In order that the lever 71, which is provided with the weight 74 may be so tilted upwardly and forwardly as to carry the weight beyond the dead center and have it thereby throw the pinion into clutch with the wheel 33 which causes the starting of the rack bar from left to right, an additional mechanism is provided and which will be now described.

Figure 1:
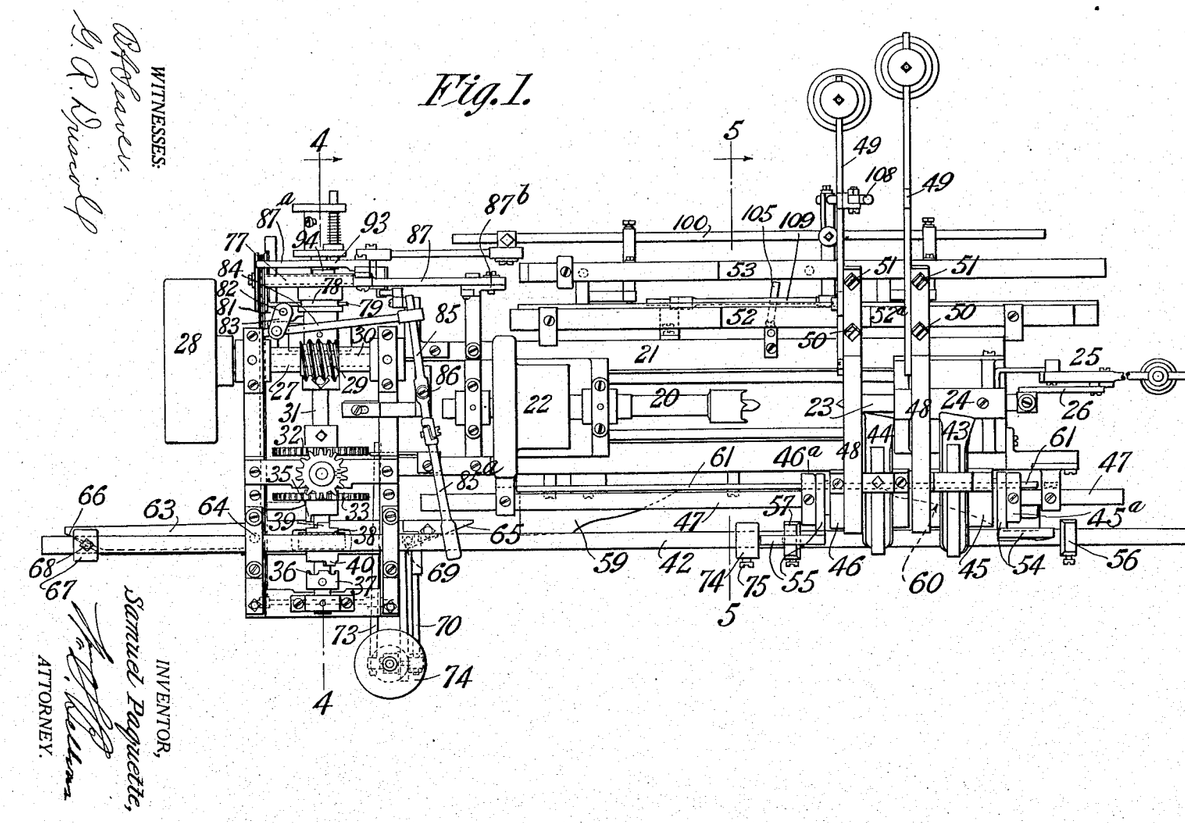
Figure 1 is a plan view of the improved machine.
Figure 2:
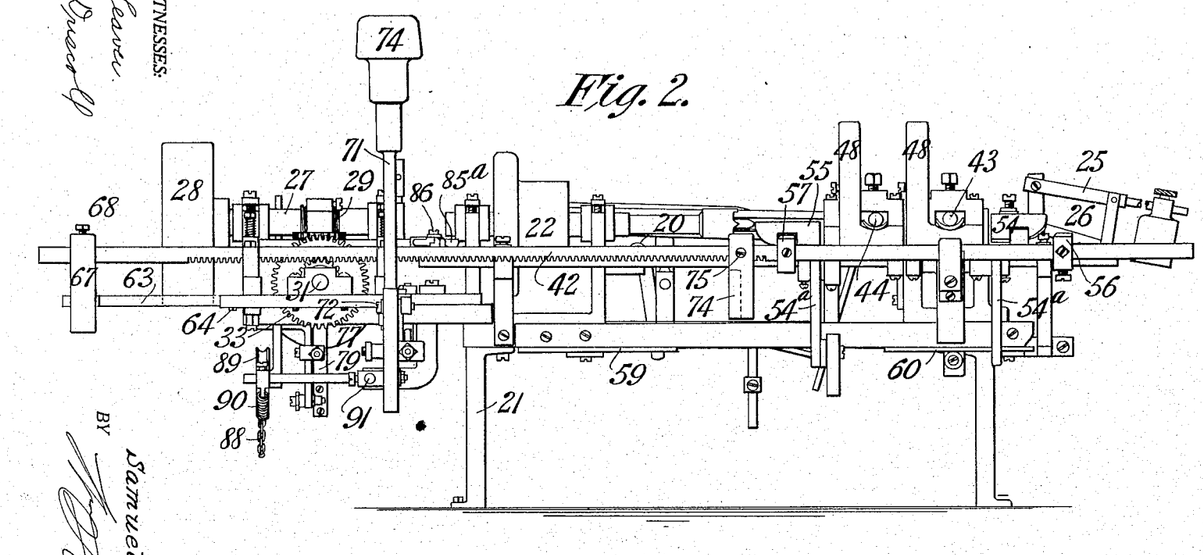
Fig. 2 is a front elevation of the same.
Figure 3:
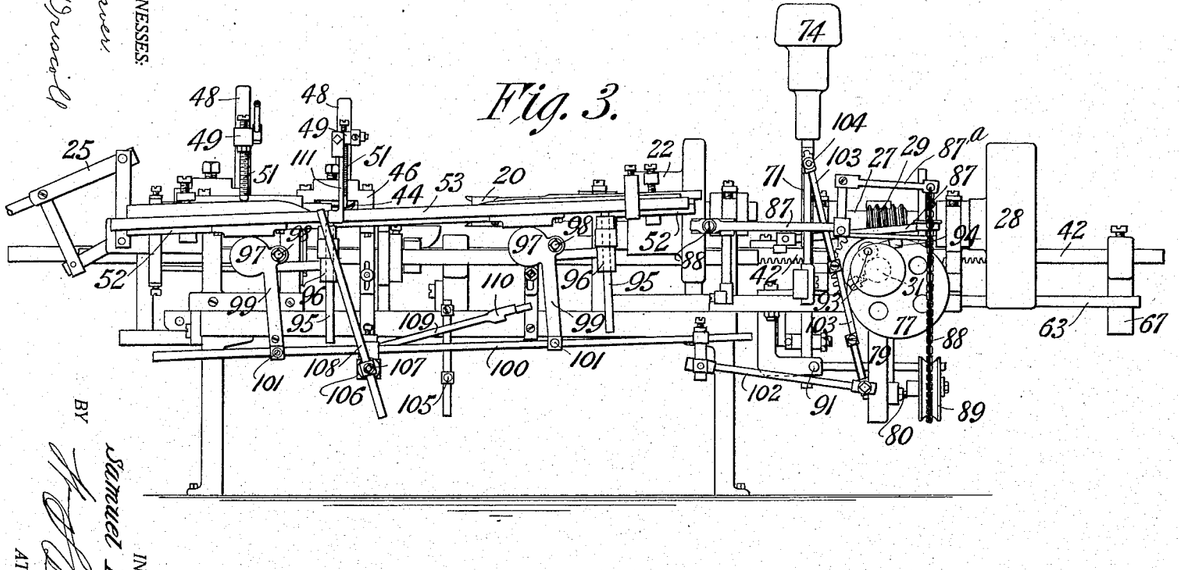
Fig. 3 is a rear elevation.

77 represents a cam which is loose on the shaft 31 and which by gravity has a normal position with its prominent or radially distended portion down-hanging as shown in Figs. 3 and 4. The hub of the loosely mounted cam is provided with a groove 78 with which engages the bifurcated upper end or yoke of a lever 79 which by pivot 80 is connected to a fixture of the frame to swing in a rearward and back to a forward position parallel with the shaft 30 and to move the cam, changing the position thereof along the shaft. The lever 79 is held in its forwardly swung position to maintain the cam 77 correspondingly forward by the spring 80ª. The lever 79 has an extension 81 projecting horizontally leftward, provided with a fixed upstanding rod 82 to the upper portion of which a link 83 is connected, and to the forward end of which link the arm 84 of the bell crank lever is connected, the other arm 85 of the bell crank lever being pivoted at 86 on a fixture of the frame, and its forwardly extended portion 85ª has a position closely to and across the top of the rack bar 42, as shown in Figs. 1 and 2.

87 represents a more or less nearly horizontal lever connected to a bracket of the frame by the pivot 87ᵇ and lying across the top of the cam 77, this lever being provided with an upstanding angular arm 87ª, to the end of which is connected a chain or other flexible connection 88, which frame has a depending course to guidance half way around a sheave 89 and thence forwardly under the machine to connection, through the medium of the spring 90 with the rod 91 which is connected with the lower end portion of the weight carrying lever 71 below the pivot 72 of such lever; said rod 91 is guided loosely through the hanger bracket 92 and supported by the frame.

On the rear end of the shaft 31 is a disk provided with an eccentrically arranged stud 93 which is revoluble in a plane adjacent the rear face of the cam. The cam has on its rear face a projecting lug 94 opposite the circular path of the revoluble stud 93. The rack bar being driven in its return or right to left movement approaches the limit of such movement; and concurrently with the dog 74 forcing the pinion shifter lever 63 to move the pinion to its intermediate or idle position,—out of clutch,—the said dog also engages the forwardly projecting arm 85ª, and through the described connections slides the cam rearwardly on the shaft to carry the projection 94 thereof across the path of the constantly revolving stud 93 so that shortly thereafter the stud engaging the cam lug will cause an overturning of the same so that the high part thereof is uppermost. This cam having such movement, swings the lever 87 and its arm 87ª upwardly, imparting a draft to the chain and a pulling movement on the lever 71 sufficient to tilt it upwardly and forwardly, whereupon the weight caused to have a position forward of the dead center 72 swings the lever forward, causing a movement of the link 70,—connected below the pivot 72,— leftward and slides the pinion into clutch with the gear wheel 32 so that now the rack bar 42 will commence again its left to right movement for effecting the feed of the cutters. In the interval while the pinion remains in its intermediate and idle position and there is no feeding movement of the cutters, the operative has time to move the finished turned piece and center support a new blank on and between the spindles. Shortly after the placing of the pinion 33 in clutch with the wheel 34, causing a traveling movement of the rack bar to the rightward, the dog 74 recedes from engagement with the lever arm 85ª, and permits the cam shifting lever 79 to be forwardly drawn by the retracting spring 80 out of the path of the revoluble stud 93 so that the cam after having its prominent portion carried to the highest position and driven around by the revoluble stud somewhat beyond such highest position, will, when the lug of such cam becomes disengaged from the stud, gravitatively swing down and around to its depending position. The said cam 77 in swinging in its revoluble movement, effective as above described for the pinion shifting action, is also effective as the primary means for causing the elevation of the rear form bar 53.

The forward form bar 52 is mounted to have a fixed position, but the form bar 53 is capable of bodily vertical movements for this reason: When the rack bar is moving to the rightward for the first cut by the cutter 43 on the blank, to be followed by the second and deeper cut by tool 44, the adjustable screws 51, 51, have their coactions with the form bar 53 while the latter is in its elevated position.

The adjustment of the screw which controls the tilting of the carriage 45 is such that the cutter 43 is not permitted to swing down toward the axis of the blank as far as is the cutter 44 permitted to swing toward such axis by the adjustment of the screw 51 which controls the extent of the tilting movement of the carriage 46 on which the cutter 44 is mounted. Thus after the rack bar has made its run to the rightward,—the cutter 43 first working on the blank to be followed by the cutter 44 which turns the stock somewhat deeper,—the movable form bar 53 is let down to a lowered position so that the adjustable screw 50 may be let down for traveling and bearing engagements on the form bar 52.

The adjustable screw 50 appurtenant to the cutter carriage 46 is to be adjusted so that on the return movement of the cutters to the leftward it will permit the cutter 44 (in such return movement moving ahead of the cutter 43) to have its cut in the desired extent deeper than that made by the same cutter while it is having its rightward movement; and then on the following of the cutter 43 in its return movement to the leftward it is caused to cut still deeper than was done by the cutter 44. These effects are secured by the proper relative adjustments of the screws 50, 50, appurtenant to the respective cutter carriages and relatively to the fixed form bar 52.

The form bar 53 has depending posts 95, 95, which play through vertical guide brackets 96 supported at the rear of the machine frame. This form bar rests on oscillatory cams 97 which are hung for their swinging movements on the fixed pivots 98, 98. The cams 97 have depending tangential arms 99, 99, with both of which the rod 100, parallel with the form bar, has connections by pivots 101, 101. The rod 100 is by link 102 connected to a more or less nearly vertical lever 103 hung at its upper end by pivot 104 to a fixture of the machine and having its intermediate portion against the edge of the cam 77.

In Fig. 3 the cams are shown as in the position to permit the form bar 53 to be in its lowered position; the depending cam arms 99 being inclined downwardly and slightly toward the end of the machine at which the cam 77 is located, the parts being under the stress of the weight of the form bar 53 so that the link connected lever 103 is kept against the edge of the cam.

105 represents a fixed horizontal member suitably supported on the back of the machine frame.

The rod 100 has a bracket 106 affixed thereon and depending therebelow, through which is a transverse rock shaft 107 at the rear or outer edge of which is an upstanding rod 108, while inwardly therefrom, affixed on such rock shaft 107, is another rod 109 extended more or less horizontally and longitudinally of the machine and having a notched shoulder 110 near its free end for engagement with the aforementioned member 105.

When the cam 77 is turned around, as has been before described, it forces the lever 103 toward the tail end of the machine and through the link 102, correspondingly forces the rod 100 in the same direction, with the result of so swinging the cams 97 as to elevate the form bar 53. The rod 100 having its endwise movement as described carries the pivotally connected latch member 109 so that the same may gravitatively click or latch over the member 105, holding the form bar elevating devices in locked position, and preventing the lowering of the form bar until when both cutters have run to the end of their first traverse, that is to their limit of movement toward the tail end of the machine, an action transpires which causes the release of the latch 110 and the lowering of the cams 97, and the letting down of the form bar 53 to the position shown in Fig. 3. The latch release is accomplished by means of a depending member 111 carried by the weighted lever extension 49 appurtenant to the tiltable carriage 46 for the cutter 44.

When the carriage 46 has carried the cutter to its limit away from the head end of the machine and is about to retrace toward such end, the member 111 abuts against the upstanding rockable rod 108 oscillating the rockshaft 107, and swinging the latch 110 upwardly out from its engagement with the catch member 105, the position of the parts now being as seen in Fig. 3, and it being understood that as the carriage is moved toward the head of the machine and the member 111 passes away from engagement with the member 108, the latter automatically swings to let the member 109 gravitatively swing down to rest on the catch member 105 in readiness to have the form bar elevating devices again operated and reset at the beginning of the next operation of the machine.

On the motion of the rack bar to the rightward, the traverse of the cutter carriage 45 commences its movement and nearly or quite carries its cutter 43 to the right to the end of the blank engaged by the end of the tail spindle 23 before the cutter carriage 46 commences its movement, for causing the traverse of the cutter 44 for the second cut on the blank; and then on the reverse traverse the cutter carriage 46 moves to the leftward to carry the cutter 44 on its return movement to the leftward, and about as far as the end of the blank engaged by head spindle 20, before the cutter carriage 45 begins its movement, so that both cutters will not necessarily be operating on the stock at the same time, as in some cases would cause the slipping of the stock held by and relatively to the spindles.

When the rack bar commences its movement to the right, the carriage 46 is unlocked from the dog 57 and the dog is considerably to the leftward thereof. The carriage 45 is at this time connected with the rack bar by the latch 54. After the carriage so latched has made its pass along the stock to and beyond the end thereof, the latch 54 is released by its engagement with the fixed cam 60 and the dog 56 is permitted to pass to the rightward beyond the latch (Figs. 1 and 2).

The dog 57 in moving to the rightward, arriving at the location of the latch 55 becomes engaged with the carriage 46 by striking the collar 46ª and forces the carriage to the rightward until the latch 55 movable in unison with the carriage has passed away from the cam 59, whereupon the latch gravitatively falls into engagement with the dog so that on the return movement of the rack bar the carriage 46 will move therewith before the carriage 45 commences its movement. The rightward motion of the carriage 45 having been stopped and the carriage 46 in its rightward movement having moved closely up to the carriage 45 (as seen in Figs. 1 and 2), on the reversing movement of the rackbar the carriage 46 by reason of being connected by the latch 55 moves to the leftward or past the left end of the blank, engaged by the head spindle 20, and the latch thereafter becomes disengaged by the coaction therewith of the cam 59. In the leftward movement of the rackbar there is a lost motion by such bar relatively to the carriage 45 until the dog 56 encounters the collar 45ª on the right hand portion of the carriage and forces the carriage to the leftward. The leg 54ª of the latch 54 on passing away from its engagement with the cam 60 gravitatively operates the latch to interlock with the dog 56 of the rack bar so that on the next right hand operation of the rackbar the carriage 45 will have its movement before the movement in the same direction of carriage 46 commences.

On the stationary form bar 52 at the portion opposite the tail stock 24 is a raised portion 52ª with which the screw or bearing member 50 of the arm 48 appurtenant to the carriage 45 impinges after the cutter 43 has passed, in its turning action, beyond the blank. This causes the upswinging of the cutter 43 to the position relatively to the cutter 44 shown in Fig. 5, so that the cutter 43 clears the bearing support or tail stock 44,—this capability being desirable as the machine is designed, inasmuch as the ends of the cutters are necessarily comparatively near the axis of the stock supporting spindles.

Briefly summarizing the operations of the various mechanisms comprised in the machine: When the carriages are in their positions toward the head end of the machine,—opposite those shown in Figs. 1 and 2, the pinion is in clutch with the wheel 33 for the driving of the rackbar to the rightward. At this time of the commencement of the operation, the movable rearwardly located form bar 53 is elevated and impinged against by the screws or adjustable bearing members 51, 51, appurtenant to the cutter carriages 45 and 46, and which governs the first and second cuts made on the blank for partially turning the latter down to its ultimate size and shape. The right hand carriage 45 first moves to the rightward followed by the carriage 46, and as the carriage 46 reaches its right hand limit the member 111 appurtenant to such carriage effects the disengagement of the catch 110 from the engagement member 101 and permits the release and lowering of the cam elevated and cam supported form bar 53.

The pinion is, when the rack bar reaches the desired limit of rightward movement, shifted forwardly to engagement with the shaft carried clutch member 37 by the action of the dog 67 on the shifter lever 63, the weighted lever 71 coöperating in the pinion shifting action and the rack bar has its return movement to the leftward, the movement of the carriage 46 first beginning, to be then followed by the carriage 45, which after the carriage 46 is unlatched, nearly overtakes such carriage beyond the spindle 20 and about opposite the head stock. The dog 74 coacting with the right hand inclined portion of the pinion shifter draws the pinion to its intermediate idle position, causing the cessation of the rackbar movement and leaving the carriages to dwell. The dog 74 encountering the lever 85, 85ª, effects the positioning of the slidable cam 77, whereby it is subject to the engagement of the shaft carried revoluble stud 93 and caused to both elevate and reset the movable form bar and to overbalance the upstanding weighted lever for swinging it from its very slightly rearwardly upwardly tilted position to its upwardly and forwardly tilted position, effecting the positive carrying of the slidable pinion to clutch with the wheel 33 and the starting of the machine for its next operation.

I claim:—

1. In a turning machine, stock supporting and rotating means, cutters, and means for moving them one ahead of the other for action on the stock, means for causing the following cutter to operate nearer the stock axis than the leading cutter, means for reversely moving the cutters, and means for varying the relative positions of the cutters for causing the then following cutter to operate nearer the stock axis than the cutter moving ahead thereof.

2. In a turning machine, stock supporting and rotating means, a cutter, and means for moving it in one direction along the stock, a second cutter and means for moving it in the same direction along the stock after the first cutter has reached the location of the far end of the stock, means for reversely moving the second named cutter, means for reversely moving the first named cutter after the second cutter has reached the end of the stock first operated on, and means for so controlling the positions of the cutters in their back and forth movements that the relatively following one operates nearer the stock axis than the one moving in advance thereof.

3. In a turning machine, in combination, stock supporting and rotating means, a carriage having a cutter, slidably mounted parallel with the axis of the stock and movable to present the cutter variably near the stock axis, means for imparting forward and return movements to the carriage, a pair of form bars, one of which is shiftable, the carriage coacting for its position control with one of the bars while moving in one direction, means for changing the position of the shiftable form bar, whereby on the reversed movement of the carriage it will coact with and be position-controlled by the other form bar, and means for reshifting the position of the movable form bar at the end of the reversed movement of the carriage.

4. In a turning machine, in combination, stock supporting and rotating means, a carriage having a cutter, a round longitudinal rail on which the carriage is mounted for sliding movements parallel with the axis of the stock and on which it has swinging movements to present the cutter variably near the stock axis, a longitudinal bar parallel with said rail and with which the carriage has connection, means for imparting back and forth movements to said bar, a pair of form bars, one of which is shiftable, the carriage coacting for its position control with one of the bars while moving in one direction, means for changing the position of the shiftable form bar, whereby on the reversed movement of the carriage it will coact with and be position-controlled by the other form bar, and means for reshifting the position of the movable form bar at the end of the reversed movement of the carriage.

5. In a turning machine, in combination, stock supporting and rotating means, a pair of cutter carriages slidably mounted for movement longitudinally and parallel with the axis of the stock, a longitudinally ranging bar and means for imparting back and forth movements thereto, latches mounted on, and also movable relatively to, the carriages and adapted for detachable engagements with said bar, and stationary cams at different positions in the length of the machine relatively to one of which the latch on one carriage coacts in the forward movement of such carriage, and relatively to which the latch of the other carriage coacts on the reverse movement of the bar, whereby as the carriages are caused to have their sufficiently long traverses relatively to the stock the movement of the one carriage continues for a period after the termination of the movement of the carriage relatively ahead thereof.

6. In a turning machine, in combination, a frame, stock supporting and rotating means mounted thereon, a round longitudinal rail supported by the frame, a pair of cutter carriages slidably mounted for movement along said rail and adapted to swing relatively to said rail, a longitudinally ranging bar and means for imparting back and forth movements thereto, said bar having dogs at different portions of the length thereof, latches carried by and adapted to swing relatively to the carriages, to engage with and disengage from said dogs, and having cam engagement members, and stationary cams located at different portions in the length of the machine frame with which the latches of the carriages alternately coact.

7. In a turning machine, in combination, stock supporting and rotating means, a cutter carriage slidably mounted for longitudinal movement and also for a rocking movement, and having a transversely extending arm, a pair of longitudinally ranging form bars, one of which is fixed, and the other of which is movable to be raised and lowered, means for imparting longitudinal backward and forward movements to the carriage, members on the arm of the carriage for engaging the relatively higher one of the form bars in the movement of the carriage in one direction and for engaging the lower one of the form bars in its reversed movement, a constantly rotating shaft, a cam loose on said shaft, and means periodically operable and concurrently with the end of the traverse of the carriage in one direction, causing its engagement with and to be revoluble by said shaft, means actuated by the shaft engaged cam and operable to effect the elevation of the vertically movable form bar, and means for temporarily confining the form bar in its elevated position.

8. In a turning machine, in combination, stock supporting and rotating means, a cutter carriage slidably mounted for longitudinal movement and also for a rocking movement, and having a transversely extending arm, a pair of longitudinally ranging form bars, one of which is fixed, and the other of which is movable to be raised and lowered, means for imparting longitudinal backward and forward movements to the carriage, members on the arm of the carriage for engaging the relatively higher one of the form bars in the movement of the carriage in one direction and for engaging the lower one of the form bars in its reversed movement, a constantly rotating shaft, a cam loose on said shaft, means periodically operable and concurrently with the end of the traverse of the carriage in one direction, causing its engagement with and to be revoluble by said shaft, means actuated by the shaft engaged cam and operable to effect the elevation of the vertically movable form bar, means for temporarily confining the form bar in its elevated position, and means appurtenant to the carriage and operable at the termination of the traverse of the carriage in the reverse direction for releasing the said temporary confining means, leaving the form bar free to descend to its lowered position.

9. In a turning machine, in combination, stock supporting and rotating means, a cutter carriage slidably mounted for movement longitudinally and parallel with the axis of the stock and also for a rocking movement, and having a transversely extending arm, a longitudinally ranging fixed form bar and a longitudinally arranged form bar which is vertically movable from a position lower to a position higher than the fixed form bar, a pair of cams pivoted for oscillating and provided with depending members on which cams the movable form bar is supported, a rod arranged below and parallel with the movable form bar and pivotally connected with said depending cam members, a constantly rotating shaft, a cam loose on said shaft and means periodically operable and concurrently with the end of the traverse of the carriage in one direction for causing its engagement with and to be revolved by said shaft, a swinging lever coacting with the cam, a link connected to said lever and to said parallel rod, means for temporarily confining the form bar in its elevated position, and means carried by the carriage and operable at the termination of the traverse of the carriage in its reverse direction for releasing the said temporary confining means.

Signed by me at Springfield, Mass., in presence of two subscribing witnesses.

SAMUEL PAQUETTE.

Witnesses:
G. R. DRISCOLL,
J. D. LONG.

Copies of this patent may be obtained for five cents each, by addressing the "Commissioner of Patents, Washington, D. C."